United States Patent
Wolff et al.

(10) Patent No.: US 11,632,747 B2
(45) Date of Patent: *Apr. 18, 2023

(54) DUPLEX DISTANCE MODIFICATION AND BLANK NB-IOT SUBCARRIERS

(71) Applicant: Nokia Solutions and Networks Oy, Espoo (FI)

(72) Inventors: Gunter Wolff, Laupheim (DE); Man Hung Ng, Swindon (GB); Iwajlo Angelow, Atlanta, GA (US)

(73) Assignees: Nokia of America Corporation, Murray Hill, NJ (US); Nokia Solutions and Networks GMBH & Co. KG, Munich (DE); Nokia UK Limited, Bristol (GB)

( * ) Notice: Subject to any disclaimer, the term of this patent is extended or adjusted under 35 U.S.C. 154(b) by 123 days.

This patent is subject to a terminal disclaimer.

(21) Appl. No.: 17/201,725

(22) Filed: Mar. 15, 2021

(65) Prior Publication Data

US 2021/0204279 A1 Jul. 1, 2021

Related U.S. Application Data

(63) Continuation of application No. 16/311,544, filed as application No. PCT/US2016/049969 on Sep. 1, (Continued)

(51) Int. Cl.
*H04W 72/04* (2023.01)
*H04W 16/02* (2009.01)
(Continued)

(52) U.S. Cl.
CPC ........ *H04W 72/0413* (2013.01); *H04B 1/715* (2013.01); *H04L 5/14* (2013.01); *H04W 16/02* (2013.01)

(58) Field of Classification Search
None
See application file for complete search history.

(56) References Cited

U.S. PATENT DOCUMENTS 9,319,211 B2 4/2016 Larsson et al.
10,404,442 B2 * 9/2019 Chen ................... H04W 52/243
(Continued)

FOREIGN PATENT DOCUMENTS

CN 1288644 A 3/2001
CN 102396279 A 3/2012
(Continued)

OTHER PUBLICATIONS

Ericsson, "NB-IoT guard ba nd operation for small LTE bandwidth," 3GPP TSG-RAN WG4, Meeting #78b, R4-162098, San Jose del Cabo, Mexico, Apr. 11-15, 2016, 4 pages.
(Continued)

*Primary Examiner* — Xavier S Wong
(74) *Attorney, Agent, or Firm* — Lippes Mathias LLP (57) ABSTRACT

Various communication systems may benefit from an improved signaling protocol. For example, communication systems may benefit from an improved network support for a narrowband internet of things in a hosting long term evolution carrier. A method, in certain embodiments, includes shifting a frequency of a downlink long term evolution channel by a pre-determined amount. The shift causes a duplex distance between the downlink long term evolution channel and an uplink long term evolution channel to change. The method includes blanking at least one overlapping radio resource in at least one of the uplink long term evolution channel or an uplink narrowband internet of things channel. The uplink narrowband internet of things channel and the uplink long term evolution channel at least partially overlap. In addition, the method includes receiving data on the uplink narrowband internet of things channel and (Continued)

an additional uplink narrowband internet of things channel at a network entity from a user equipment.

25 Claims, 8 Drawing Sheets

Related U.S. Application Data 2016, now Pat. No. 10,986,614, which is a continuation-in-part of application No. PCT/US2016/039580, filed on Jun. 27, 2016.

(51) Int. Cl.
 *H04B 1/715* (2011.01)
 *H04L 5/14* (2006.01)

(56) References Cited

U.S. PATENT DOCUMENTS

| | | | |
|---|---|---|---|
| 10,986,614 B2 * | 4/2021 | Wolff | H04L 5/14 |
| 2002/0079990 A1 | 6/2002 | Miyamoto | |
| 2004/0257873 A1 | 12/2004 | Shieh et al. | |
| 2010/0113050 A1 | 5/2010 | Cheng et al. | |
| 2012/0039268 A1 * | 2/2012 | Hakkinen | H04W 72/082 |
| | | | 370/329 |
| 2012/0076056 A1 | 3/2012 | Tillman et al. | |
| 2015/0011233 A1 | 1/2015 | Kazmi et al. | |
| 2017/0208592 A1 | 7/2017 | Rico Alvarino et al. | |
| 2018/0006763 A1 | 1/2018 | Kim et al. | |

FOREIGN PATENT DOCUMENTS

| | | |
|---|---|---|
| CN | 102893647 A | 1/2013 |
| WO | WO 2015/188848 A1 | 12/2015 |

OTHER PUBLICATIONS

NTT Docomo, Inc, "Forward compatibility related to mMTC and URLLC," 3GPP TSG-RAN WG1, Meeting #85. R1-165172, Nanjingt, China, May 23-27, 2016, pp. 1-5.

Sara Landstrom et al., "NB-IoT: Asustainable Technology for Connecting Billions of Devices," Ericsson Technology Review, vol. 93, pp. 1-12, 2016.

Nokia Networks, On the channel raster design for NB-IoT, 3GPP Draft; R1-160172,TSG-RAN WG1 NB-IoT AdHoc, Budapest, Hungary Jan. 18-20, 2016, XP051053491.

\* cited by examiner

DUPLEX DISTANCE MODIFICATION AND BLANK NB-IOT SUBCARRIERS

CROSS-REFERENCE TO RELATED APPLICATIONS

The present application is a continuation of, U.S. patent application Ser. No. 16/311,544, filed on Sep. 1, 2016, which is a 371 of International Application No. PCT/US2016/049969, filed Sep. 1, 2016, which is a continuation-in-part of International Application No. PCT/US2016/039580, filed on Jun. 27, 2016. The entire content of the aforementioned applications is hereby incorporated by reference.

BACKGROUND OF THE INVENTION

Various communication systems may benefit from an improved signaling protocol. For example, communication systems may benefit from an improved network support for a narrowband internet of things in a hosting long term evolution carrier.

DESCRIPTION OF RELATED ART

Narrowband internet of things (NB-IoT) can help facilitate low data rate communications between machines or objects in 3rd Generation Partnership Project (3GPP) technology. A downlink transmission on the NB-IoT may consist of a 180 kilohertz (kHz) wide orthogonal frequency-division multiplexing (OFDM) signal having 12 subcarriers. The subcarriers may be arranged in a similar way to a single Long Term Evolution (LTE) physical resource block (PRB), and the physical time structure of the NB-IoT may also be similar to a single LTE PRB.

In order to save resources, the NB-IoT may be operated in-band of a hosting LTE carrier or at a guard band of a hosting LTE carrier. A guard band may be an unused part of the radio spectrum between radio bands, for the purpose of preventing interference. In-band signaling, on the other hand, may be the sending of information within the same band. Because of the similar structures of the NB-IoT and the hosting LTE carrier, including similar subcarrier spacing and symbol length, the combined system may benefit from orthogonality. Orthogonality can be used to reduce interference between NB-IoT and LTE without filtering.

Compared to operating the NB-IoT at the guard band of a hosting LTE, operating the NB-IoT in-band will cause the NB-IoT to occupy the resources of a hosting LTE PRB. Occupying the hosting LTE PRB can reduce the maximum LTE throughput. In addition, the LTE PRB that is hosting the NB-IoT may still carry LTE information, such as LTE control and reference signals. In some embodiments, only physical downlink shared channel (PDSCH) resources of the PRB may be released to the NB-IoT. The NB-IoT, therefore, may not be able to exploit the full capabilities of the PRB.

Operating the NB-IoT at the guard band of a hosting LTE, however, may require a passband extension with a restriction that both LTE and NB-IoT are to be centered on a given channel raster. For example, the LTE and NB-IoT may be centered on the 100 kHz channel raster, with a tolerable deviation of 7.5 kHz from the perspective of a user equipment (UE). In addition, stop band requirements may be applied to the hosting LTE.

Given some of the limitations of operating the NB-IoT in the guard band, LTE band options, particularly those having low bandwidth, can have too little room to host an NB-IoT. For example, LTE 1.4 and LTE 3 only have a 160 kHz and 150 kHz guard band, respectively, at each side of the transmission bandwidth configuration. Such guard bands do not have sufficient bandwidth to host a 180 kHz NB-IoT channel.

SUMMARY OF THE INVENTION

A method, in certain embodiments, may include shifting a frequency of a downlink long term evolution channel by a pre-determined amount. The shift may cause a duplex distance between the downlink long term evolution channel and an uplink long term evolution channel to change. The method may also include blanking at least one overlapping radio resource in at least one of the uplink long term evolution channel or an uplink narrowband internet of things channel. The uplink narrowband internet of things channel and the uplink long term evolution channel may at least partially overlap. In addition, the method may include receiving data on the uplink narrowband internet of things channel and an additional uplink narrowband internet of things channel at a network entity from a user equipment.

According to certain embodiments, an apparatus may include at least one memory including computer program code, and at least one processor. The at least one memory and the computer program code may be configured, with the at least one processor, to cause the apparatus at least to shift a frequency of a downlink channel by a pre-determined amount. The shift may cause a duplex distance between the downlink long term evolution channel and an uplink long term evolution channel to change. The at least one memory and the computer program code may also be configured, with the at least one processor, at least to blank at least one overlapping radio resource in at least one of the uplink long term evolution channel or an uplink narrowband internet of things channel. The uplink narrowband internet of things channel and the uplink long term evolution channel may at least partially overlap. In addition, the at least one memory and the computer program code may also be configured, with the at least one processor, at least to receive data on the uplink narrowband internet of things channel and an additional uplink narrowband internet of things channel at a network entity from a user equipment.

An apparatus, in certain embodiments, may include means for shifting a frequency of a downlink long term evolution channel by a pre-determined amount. The shift may cause a duplex distance between the downlink long term evolution channel and an uplink long term evolution channel to change. The apparatus may also include means for blanking at least one overlapping radio resource in at least one of the uplink long term evolution channel or an uplink narrowband internet of things channel. The uplink narrowband internet of things channel and the uplink long term evolution channel may at least partially overlap. In addition, the apparatus may include means for receiving data on the uplink narrowband internet of things channel and an additional uplink narrowband internet of things channel at a network entity from a user equipment.

According to certain embodiments, a non-transitory computer-readable medium encoding instructions that, when executed in hardware, perform a process. The process may include shifting a frequency of a downlink long term evolution channel by a pre-determined amount. The shift may cause a duplex distance between the downlink long term evolution channel and an uplink long term evolution channel to change. The process may also include blanking at least one overlapping radio resource in at least one of the uplink long term evolution channel or an uplink narrowband internet of things channel. The uplink narrowband internet of things channel and the uplink long term evolution channel may at least partially overlap. In addition, the process may include receiving data on the uplink narrowband internet of things channel and an additional uplink narrowband internet of things channel at a network entity from a user equipment.

According to certain embodiments, a computer program product encoding instructions for performing a process according to a method including shifting a frequency of a downlink long term evolution channel by a pre-determined amount. The shift may cause a duplex distance between the downlink long term evolution channel and an uplink long term evolution channel to change. The method may also include blanking at least one overlapping radio resource in at least one of the uplink long term evolution channel or an uplink narrowband internet of things channel. The uplink narrowband internet of things channel and the long term evolution uplink channel may at least partially overlap. In addition, the method includes receiving data on the uplink narrowband internet of things channel and an additional uplink narrowband internet of things channel at a network entity from a user equipment.

A method, in certain embodiments, may include receiving an indication through a downlink long term evolution channel of a shift in frequency in the downlink channel by a pre-determined amount. The shift causes a duplex distance between the long term evolution downlink channel and an uplink long term evolution channel to change. The method can also include transmitting from a user equipment to a network entity data on an uplink narrowband internet of things channel and an additional uplink narrowband internet of things channel. The at least one overlapping radio resource in at least one of the uplink long term evolution channel or the uplink narrowband internet of things channel may have been blanked. The uplink narrowband internet of things channel and the uplink long term evolution channel may at least partially overlap.

According to certain embodiments, an apparatus may include at least one memory including computer program code, and at least one processor. The at least one memory and the computer program code may be configured, with the at least one processor, to cause the apparatus at least to receive an indication through a long term evolution downlink channel of a shift in frequency in the long term evolution downlink channel by a pre-determined amount. The shift may cause a duplex distance between the downlink long term evolution channel and an uplink long term evolution channel to change. The at least one memory and the computer program code may also be configured, with the at least one processor, to cause the apparatus at least to transmit from a user equipment to a network entity data on an uplink narrowband internet of things channel and an additional uplink narrowband internet of things channel. The at least one overlapping radio resource in at least one of the uplink long term evolution channel or the uplink narrowband internet of things channel may have been blanked. The uplink narrowband internet of things channel and the uplink long term evolution channel may at least partially overlap.

An apparatus, in certain embodiments, may include means for receiving an indication through a downlink long term evolution channel of a shift in frequency in the downlink long term evolution channel by a pre-determined amount. The shift may cause a duplex distance between the downlink long term evolution channel and an uplink long term evolution channel to change. The apparatus may also include means for transmitting from a user equipment to a network entity data on an uplink narrowband internet of things channel and an additional uplink narrowband internet of things channel. The at least one overlapping radio resource in at least one of the uplink long term evolution channel or the uplink narrowband internet of things channel may have been blanked. The uplink narrowband internet of things channel and the uplink long term evolution channel may at least partially overlap.

According to certain embodiments, a non-transitory computer-readable medium encoding instructions that, when executed in hardware, perform a process. The process may include receiving an indication through a downlink long term evolution channel of a shift in frequency in the downlink channel by a pre-determined amount. The shift may cause a duplex distance between the downlink long term evolution channel and an uplink long term evolution channel to change. The process may also include transmitting from a user equipment to a network entity data on an uplink narrowband internet of things channel and an additional uplink narrowband internet of things channel. The at least one overlapping radio resource in at least one of the uplink long term evolution channel or the uplink narrowband internet of things channel may have been blanked. The uplink narrowband internet of things channel and the uplink long term evolution channel may at least partially overlap.

According to certain embodiments, a computer program product encoding instructions for performing a process according to a method including receiving an indication through a downlink long term evolution channel of a shift in frequency in the downlink channel by a pre-determined amount. The shift may cause a duplex distance between the downlink long term evolution channel and an uplink long term evolution channel to change. The method may also include transmitting from a user equipment to a network entity data on an uplink narrowband internet of things channel and an additional uplink narrowband internet of things channel. The at least one overlapping radio resource in at least one of the uplink long term evolution channel or the uplink narrowband internet of things channel may have been blanked. The uplink narrowband internet of things channel and the uplink long term evolution channel may at least partially overlap.

DESCRIPTION OF THE DRAWINGS

For proper understanding of the invention, reference should be made to the accompanying drawings, wherein.

DETAILED DESCRIPTION

Certain embodiments may allow an NB-IoT to operate in the guard band of a host LTE by increasing the size of the guard band, or the available bandwidth in the host LTE. For example, the frequency of the LTE downlink channel may be shifted by a pre-determined amount. This shift may change the duplex distance between the downlink channel and the uplink channel of the LTE. The NB-IoT downlink channel may also be shifted. In some embodiments, radio resources or subcarriers of the LTE uplink channel and/or the NB-IoT uplink channel may be blanked. Additional resources in an additional NB-IoT uplink channel may be provided to compensate for blanked or unused resources. The above embodiments can help to facilitate the operation of the NB-IoT on the guard band of the host LTE.

Figure 1:
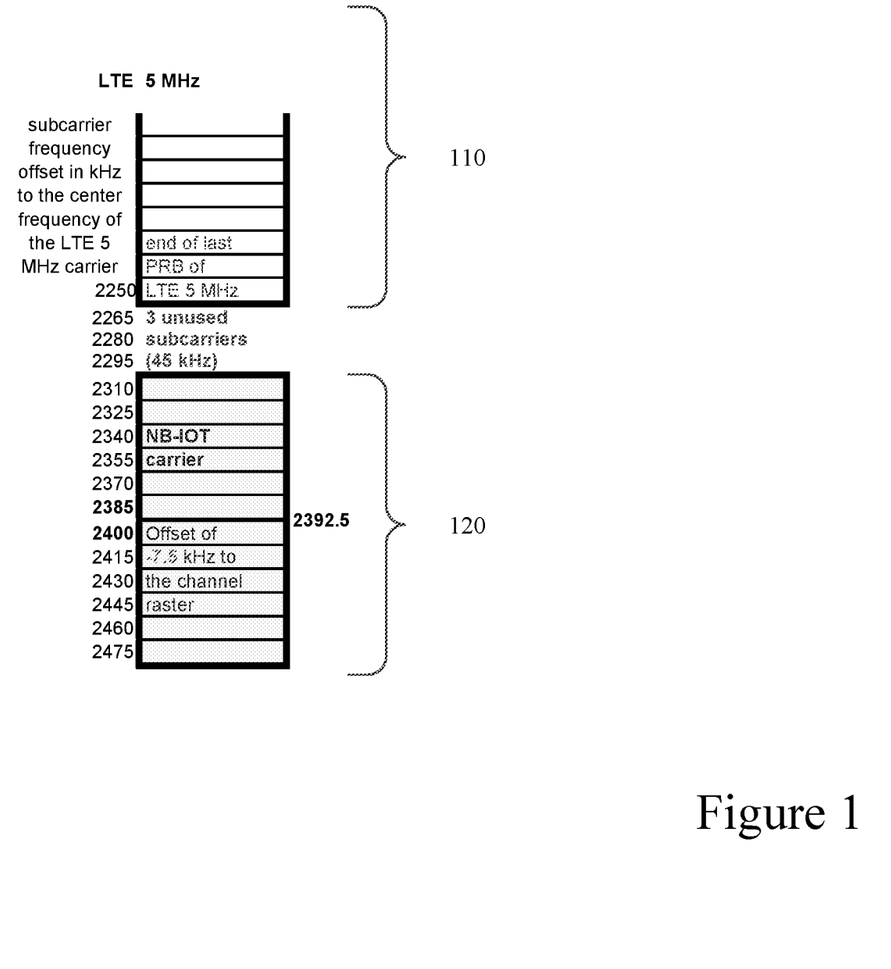
FIG. 1 illustrates carriers according to certain embodiments.

FIG. 1 illustrates carriers according to certain embodiments. Specifically, FIG. 1 illustrates a part of an LTE carrier 110 (8 of 12 subcarriers of the LTE carrier are shown in FIG. 1) and an NB-IoT carrier 120. NB-IoT carrier 120 can include frequencies ranging from 2302.5 kHz to 2482.5 kHz. LTE carrier 110 may be an LTE carrier with a 5 MHz channel bandwidth and a carrier frequency at 2 GHz. Other channel bandwidths, such as 1.4 MHz and 3 MHz, may also be used. Duplex distance or spacing may be the space between the uplink and the downlink frequencies of a channel. While FIG. 1 illustrates carrier 110 with a 5 MHz channel bandwidth, other embodiments may involve an LTE carrier with a different channel bandwidth.

The outermost LTE with a 5 MHZ channel bandwidth carrier 110 can be centered at 2250 kHz off the LTE center frequency. In some embodiments both the LTE and the NB-IoT are centered on the 100 kHz channel raster, and a 7.5 kHz offset may be tolerable. A channel raster may be a given frequency used by a communication device. In order to be aligned with the 100 kHz channel raster, the NB-IoT carrier can be centered at 2392.5 kHz off the LTE center frequency.

As can be seen in FIG. 1, NB-IoT carrier 120 has 12 subcarriers. The outer NB-IoT subcarrier may be 2475 kHz off the LTE center, and will have a width of 15 kHz. The upper pass band edge of the outer NB-IoT subcarrier is 2482.5 kHz relative to the LTE center. In certain embodiments, the stop band may be fulfilled at 2.5 MHz, which means that 17.5 kHz are left for filter roll-off A stopband can be a band frequency through which a filter does not allow signals to pass. This limited filter roll-off of 17.5 kHz may lead to a long filter impulse response having many filter taps. The long impulse response may not only eat up the cyclic prefix, but can also lead to multiple inter-symbol interferences that decrease the signal-to-interference-plus-noise ratio (SINR).

Certain embodiments can provide an apparatus, method, means, or computer program product for lengthening the guard band of the LTE carrier or PRB. Lengthening of the guard band may allow for the operation of the NB-IoT on the guard band of the hosting LTE. The LTE can be referred to as a hosting LTE because it can allow the NB-IoT to use an available subcarrier or an available radio resource in the LTE PRB. The available subcarrier or the available radio resource may be in the guard band of the LTE PRB or in-band of the LTE PRB. Some embodiments may shift the frequency of the downlink channel of the LTE and/or the downlink channel of the NB-IoT. The shift may be by a pre-determined amount determined by a network entity or a network operator. For example, the shift amount may be −100 kHz. When the shift amount is −100 kHz, the 17.5 kHz left for the filter roll-off may be increased to 117.5 kHz.

In a downlink channel, the 100 kHz channel raster may be valid for both NB-IoT and LTE, with minor deviations, such as a few kHz, being tolerated. Integer multiples of 100 kHz are therefore also possible, with a minor deviation. In certain embodiments, no restrictions may apply to the shift in an uplink channel, allowing for the LTE and NB-IoT to be placed directly adjacent from each other. Some LTE resources may not be used in the UL, due to blanking or an empty resource block. This allows for an even closer placement, either with overlap or inside LTE band placement, of NB-IoT in UL.

On the other side of the LTE carrier 110, which does not border NB-IoT carrier 120 (not shown in FIG. 1), the −100 kHz shift decreases the range for roll-off from 242.5 kHz to 142.5 kHz. In certain embodiments, a symmetric filter with a 117.5 kHz filter toll-off may be applied. A shift in the frequency of the downlink may cause a change in the duplex distance.

While a shift of the frequency of the LTE downlink and/or NB-IoT downlink may be helpful, in certain embodiments a similar shift in the uplink may result in several disadvantages. A shift of 100 kHz in the uplink, for example, may cause significant interference to the adjacent frequency block. In certain other embodiments, no frequency shift may be applied to certain LTE UEs that occupy a 5 MHz block.

In certain embodiments, some of the downlink and/or uplink subcarriers in the hosting LTE and/or NB-IoT may be blanked. Blanking may include freeing resources or subcarriers in the downlink and/or uplink channel, or making such resources or subcarriers available for transmission by another channel Resources may be radio resource, for example, or any other resource that may be used for transmission of data. In certain embodiments, resources or subcarriers that can be blanked in the hosting LTE may be used by the NB-IoT. In other embodiments, blanking resources or subcarriers in the NB-IoT may allow for use of the resources by the hosting LTE. In addition, resources may be blanked in any location within the carrier, including the edge of the hosting LTE channel Blanking resources at the edge of the hosting LTE channel may create a larger frequency range for filter roll-off.

For example, blanking three 15 kHz subcarriers from the LTE and/or NB-IoT channels, along with the three unused subcarriers shown in FIG. 1, will allow the NB-IoT channel to be shifted −100 kHz, without the need to shift the LTE channel. In another example, blanking out three 15 kHz NB-IoT subcarriers towards the edge of the hosting LTE channel may allow for an extra 45 kHz for filter roll-off Due to the risk of uplink (UL) channel band leakage, operating the NB-IoT in the guard band of an LTE channel, for example an LTE with a 5 MHz channel bandwidth, may be difficult.

In certain embodiments, a UL channel may be set up with a fixed duplex distance. This fixed duplex distance may apply to all or some of the carriers in a band. However, in case of an NB-IoT operating in a guard band of LTE, the gap of three unused carriers, as shown in FIG. 1, may constitute a wasted spectrum that can lead to interference. In other embodiments, a network entity may signal a different duplex distance to a user equipment. For example, the network entity may send to the UE LTE system information that includes an indication of a different duplex distance. For example, the network entity may signal the UE to compensate for a frequency shift of −100 kHz for LTE. Changing the duplex distance can help close the gap between NB-IoT and LTE.

Changing the duplex distance can also allow the LTE and/or the NB-IoT to be centered in the middle of its original MHz block. The UE can be informed via the DL about the UL frequency offset of 100 kHz. This shift in the DL may extend the roll-off region from 25 kHz to 70 kHz. In certain embodiments, physical uplink control channel (PUCCH) blanking may be used. Blanking may allow the NB-IoT to shift even further towards the center of the LTE. In some embodiments, the PUCCH blanking may be restricted to a pre-determined number of sub-carriers.

In certain other embodiments, the offset in the duplex distance may be utilized to cause at least a partial overlap between frequency regions of the NB-IoT uplink channel and the LTE UL. This partial overlap may allow the NB-IoT UL to use resources that have been blanked from the LTE UL. In other embodiments, the partial overlap may allow the LTE UL to use resources that have been blanked from the NB-IoT UL. In certain embodiments, in which the hosting LTE contains an asymmetric load between the LTE DL and LTE UL, there may be unused LTE UL resources. The LTE UL may have a lower load than the LTE DL, in certain embodiments, for data traffic.

In some embodiments, the NB-IoT UL may operate in-band in the LTE UL. For example, three 15 kHz subcarriers from the LTE UL may be blanked out. The NB-IoT UL can then sit adjacent from LTE UL, which can allow for the shifting of the NB-IoT channel by −100 kHz. This embodiment can extend the roll-off region from 25 kHz to 125 kHz.

The duplex distance, in certain other embodiments, may remain fixed. The network entity may then schedule UL resources so that legacy UEs transmit in a spectrum which guarantees that no leak occurs outside the channel bandwidth. For example, only 4.5 MHz in a 5 MHz channel may be scheduled, meaning that a 250 kHz guard band can be provided on each side. The remaining spectrum may then be used for future UEs signaling, which signal better radio frequency characteristics than legacy UEs. In addition, future UE signaling may be transmitted closer to that channel bandwidth edge, for example in a 5 MHz channel bandwidth having a 150 kHz band guard. The above embodiments can allow for increased utilization of the LTE spectrum, while at the same time allowing for a feasible implementation of NB-IoT.

As discussed above, certain embodiments may include guard band NB-IoT operations. In such embodiments, the NB-IoT channel and the hosting LTE may be shifted in DL by multiples of 100 kHz. In addition, some of the resources or subcarriers in the LTE UL channel, LTE DL channel, NB-IoT DL channel, and/or the NB-IoT UL channel can be blanked out. The blanking of resources and/or the subcarriers and the DL shift may be used to create sufficiently large guard band for filter roll-off.

The location of the LTE UL can be signaled to the UE from the network entity using, for example, LTE system information. In certain embodiments, the signaled location of the LTE UL may help to prevent leakage above a limit outside the available bandwidth. The limit may be determined by any regulatory body. In certain embodiments, the UEs may support default transmitter (Tx) to receiver (Rx) separation. The placement of NB-IoT UL may occupy various resource of the LTE UL. In some embodiments, the placement of the NB-IoT may occur when there are no channel raster restrictions for the LTE and/or the NB-IoT.

In certain embodiments, steeper filtering may be used to increase the efficiency of bandwidth utilization. Steeper filtering can allow for more flexible positioning of the carriers in the available spectrum. However, since UEs may still be equipped with their original wide filters, a shift of the original carrier position may make their filters see or intercept a part of the adjacent frequency block, which can belong to a different operator. Although the impact may be reduced at the block edge because of attenuation from the Tx and Rx filter and fast Fourier transform selectivity, performance degradation or throughput may be visible. In embodiments in which the other operator may not be affected, the steeper filtering may be tolerated. Therefore, in some embodiments, UL frequency positions can be aligned with legacy filters, while DL may utilize steeper filters. In UL, the legacy UE filter may leak into the adjacent block, while in DL the network entity does not emit any signal to the other operator's frequency block.

In certain embodiments, the NB-IoT can be placed directly adjacent to the hosting LTE. In other words, the NB-IoT UL channel may be placed directly adjacent to the uplink LTE channel. In such embodiments, at least one resource or subcarrier of the hosted NB-IoT and/or hosting LTE may be blanked out. In another embodiment, PUCCH blanking may be applied to the hosting LTE carrier. This blanking may skip or make available some of the outermost LTE UL subcarriers, and allows for an even closer placement of NB-IoT to the LTE center. In addition, in some other embodiments, some resources inside the LTE UL may be reserved for NB-IoT UL, while NB-IoT is operated in-band in the UL.

In some embodiments NB-IoT subcarriers which overlap with the LTE carrier may rarely or never be used. To compensate for such unused or blank subcarriers, two half occupied NB-IoT carriers may be considered for UL on either side of the LTE carrier. In other words, the resources of the UL NB-IoT may be split on opposite sides of the LTE carrier.

Figure 2:
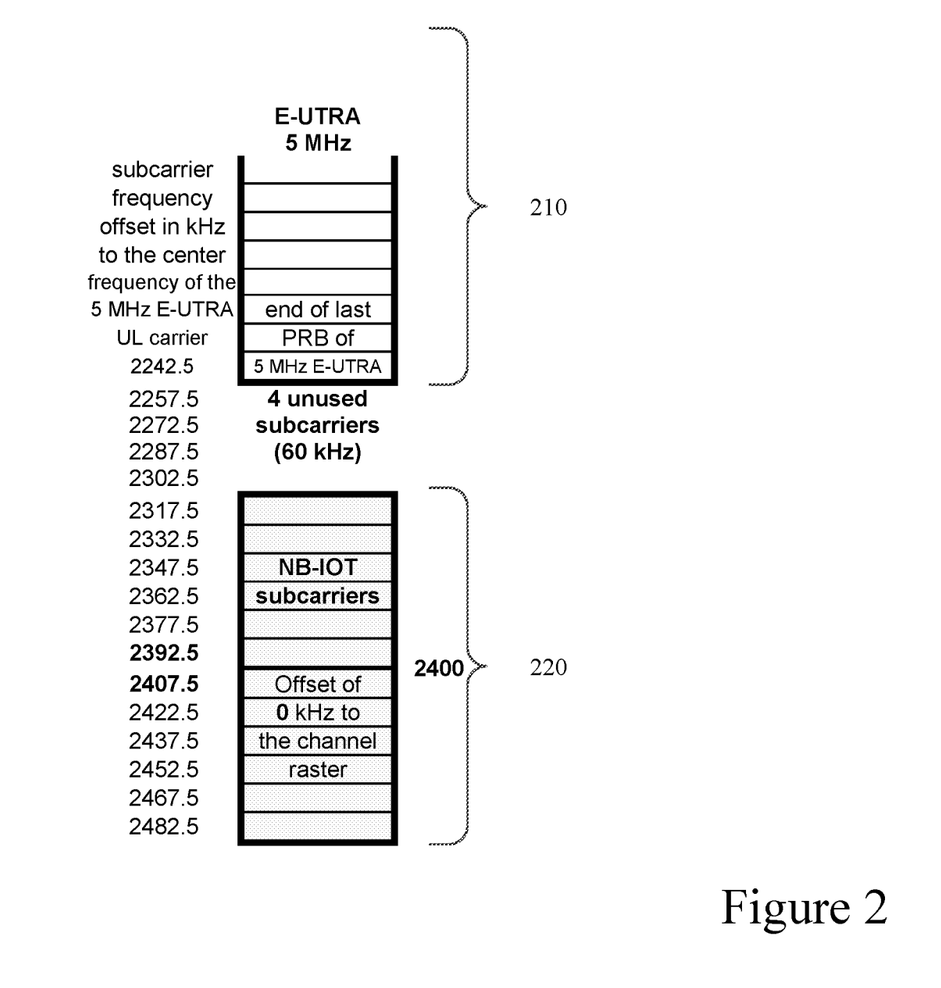
FIG. 2 illustrates carriers according to certain embodiments.

FIG. 2 illustrates carriers according to certain embodiments. Specifically, FIG. 2 illustrates an evolved Universal Mobile Telecommunications System (UMTS) Terrestrial Radio Access (e-UTRA) having a channel bandwidth of 5 MHz. An LTE carrier 210 (8 of 300 subcarriers of the LTE carrier are shown), and an NB-IoT carrier 220 may be provided. NB-IoT carrier 220 may include frequencies ranging from 2310 kHz to 2490 kHz, while the last frequency of the LTE carrier 210 may be 2250 kHz. The embodiment shown in FIG. 2 can leave 10 kHz for filter roll-off Four unused subcarriers are also shown. Each subcarrier, for example, may have a width of 15 kHz, which translates to 60 kHz being unused. Also, no offset to the channel raster of NB-IoT carrier 220 is shown in FIG. 2.

Figure 3:
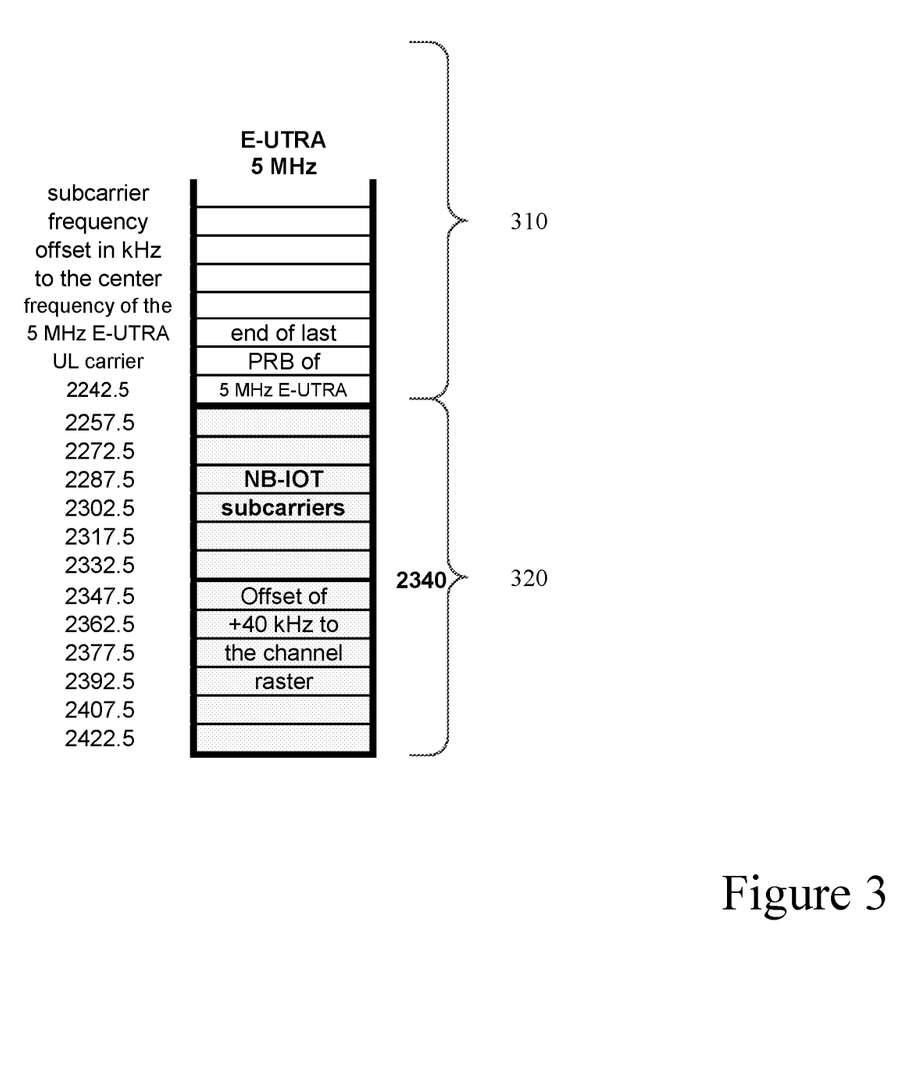
FIG. 3 illustrates carriers according to certain embodiments.

FIG. 3 illustrates carriers according to certain embodiments. Unlike the embodiment of FIG. 2, LTE carrier 310 and NB-IoT carrier 320 do not have any unused subcarriers located between the two carriers. An LTE carrier 310 (8 of 12 subcarriers of the LTE carrier are shown), and an NB-IoT carrier 320 may be provided. NB-IoT carrier 320 may include frequencies ranging from 2250 kHz to 2430 kHz, while the last frequency of the LTE carrier 310 may be 2250 kHz. This embodiment can leave 70 kHz for filter roll-off. The NB-IoT carrier 320 may have an offset of −60 kHz, such that the carrier is 40 kHz away of the closest raster point where the channel raster has a periodicity of 100 kHz. While for DL a mandatory channel raster can be defined, in certain embodiments the UL channel raster may be optional or not applicable when the UL frequency position is provided in the DL.

Figure 4:
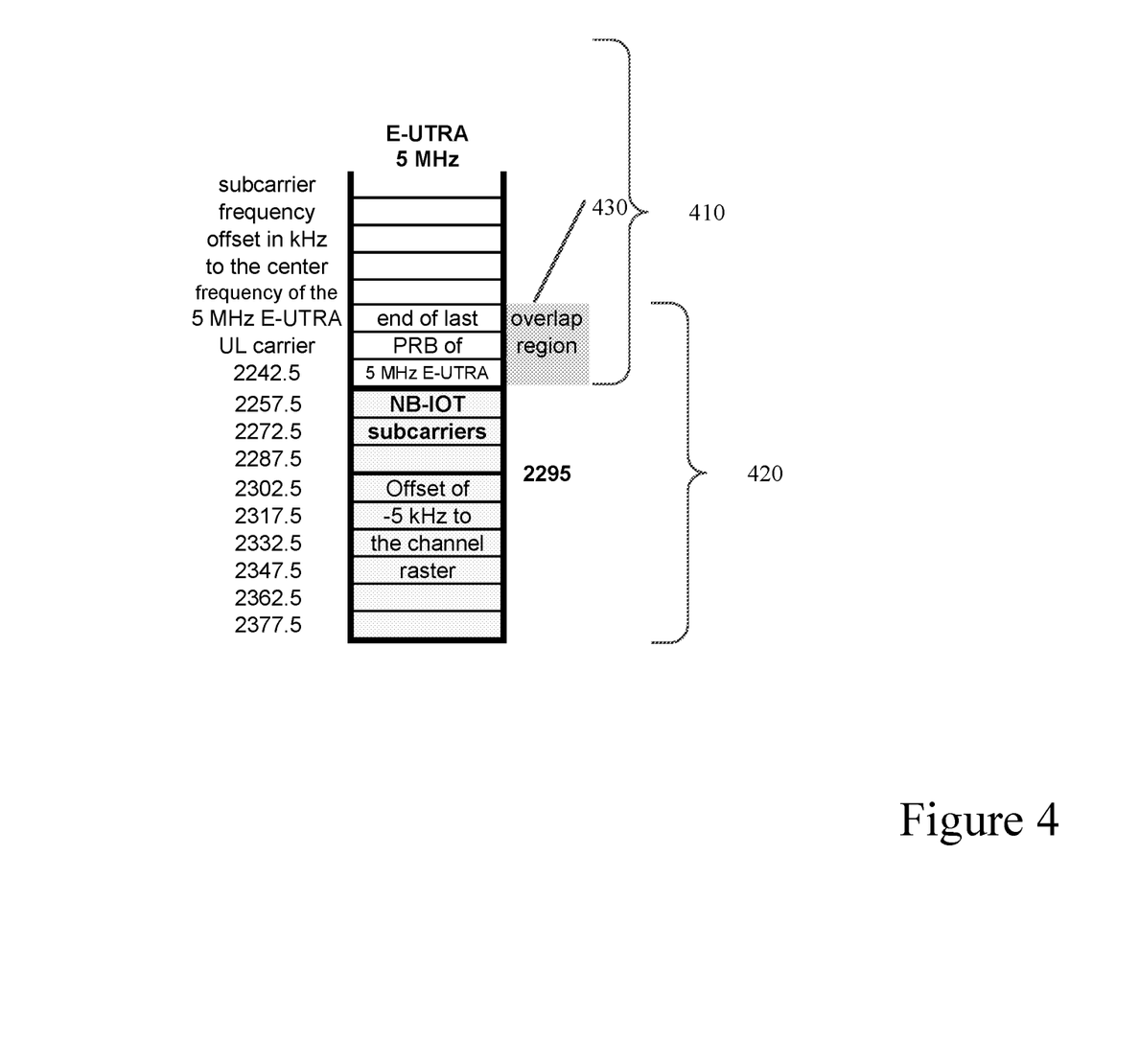
FIG. 4 illustrates carriers according to certain embodiments.

FIG. 4 illustrates carriers according to certain embodiments. In particular, FIG. 4 illustrates an embodiment in which the carriers are tightly squeezed to create an overlap region 430 between LTE carrier 410 and NB-IoT carrier 420. In the overlap region, at least one subcarrier of either LTE carrier 410 and/or NB-IoT 420 may be left blank or remain unused. Overlap region 430 between LTE carrier 410 and NB-IoT carrier 420 in the embodiment of FIG. 4 may include three subcarriers, meaning that the carriers now have nine subcarriers each that do not overlap.

In the embodiment of FIG. 4, three subcarriers from each of NB-IoT carrier 420 and LTE carrier 410 overlap with one another. For example, the overlap may occur in a frequency range between 2205 kHz and 2250 kHz. NB-IoT carrier may have an offset of −5 kHz to the channel raster, and be centered at 2295 kHz. The passband edge of NB-IoT carrier may have an offset of 2385 kHz, leaving 115 kHz for roll-off. In certain embodiments, in order to compensate for unused NB-IoT sub-carriers in the overlapped region, an additional UL carrier resource may be allocated on the other side of the LTE spectrum (not shown in FIG. 4). In other words, because the NB-IoT subcarriers in the overlap region are rarely or never used, in certain embodiments, an additional NB-IoT subcarrier resource may be added on the other side of the LTE carrier 410 to compensate for the unused NB-IoT subcarrier in the overlap region. This means that the UL NB-IoT may be split into two different carriers on opposite sides of the LTE carrier.

Figure 5:
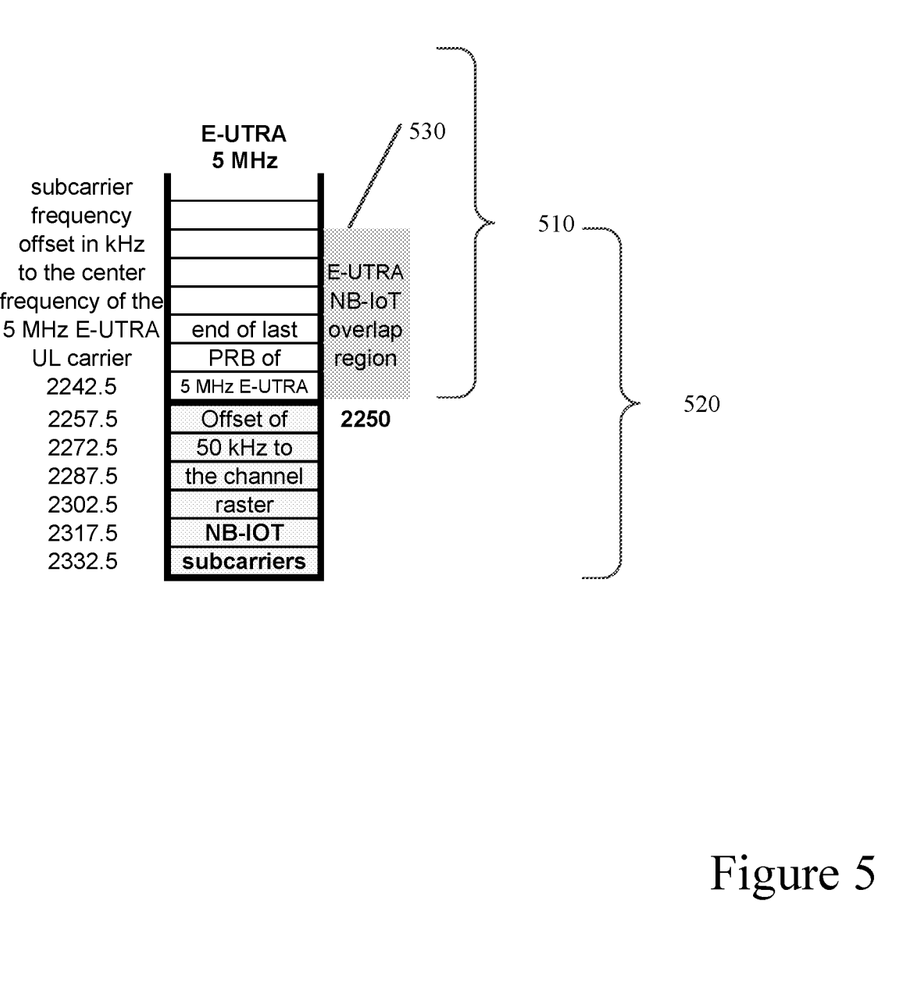
FIG. 5 illustrates carriers according to certain embodiments.

FIG. 5 illustrates carriers according to certain embodiments. In particular, FIG. 5 illustrates an embodiment in which the carriers are more tightly squeezed than the embodiment shown in FIG. 4 to create an overlap region 530 between LTE carrier 510 and NB-IoT carrier 520. As can be seen in FIG. 5, the overlap region 530 between LTE carrier 510 and NB-IoT carrier 520 may include six subcarriers, meaning that the carriers now have six subcarriers each that do not overlap. In certain embodiments, subcarriers in overlap region 530 may be blanked or unused.

NB-IoT carrier may have an offset of −50 kHz to the channel raster, and may be centered at 2250 kHz. The passband edge of NB-IoT carrier may have an offset of 2340 kHz, leaving 160 kHz for roll-off. In certain embodiments, in order to compensate for unused NB-IoT sub-carriers in the overlapped region, an additional UL carrier resource may be allocated on the other side of the LTE/E-UTRA spectrum (not shown in FIG. 5). The number of additional UL carrier resources may be based on the size of the overlap region and/or the number of subcarriers in the overlap region. In other words, in certain embodiment the UL may be split into two carriers, located on both sides of the LTE spectrum.

Figure 6:
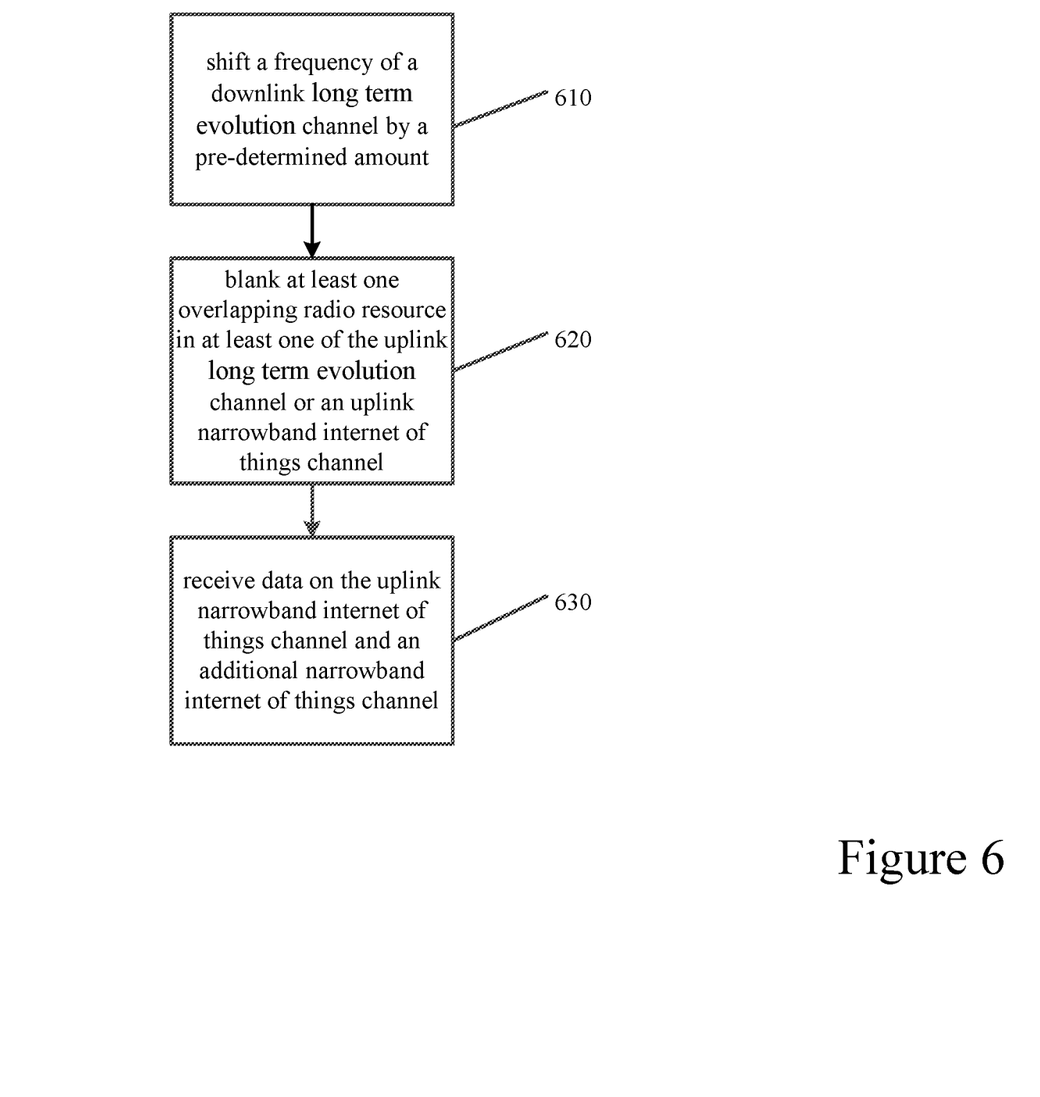
FIG. 6 illustrates a flow diagram according to certain embodiments.

FIG. 6 illustrates a flow diagram according to certain embodiments. Specifically, FIG. 6 illustrates a diagram for a process carried out by a network entity. In step 610, the network entity may determine that shifting the frequency of the DL LTE channel may be needed. The network entity may then shift the frequency of the LTE DL channel by a predetermined amount. For example, the DL LTE channel may be shifted by −100 kHz. In step 620, the network entity may blank at least one overlapping radio resource in at least one of the UL LTE channel or the UL NB-IoT. As shown in FIGS. 4 and 5, the UL NB-IoT channel and the LTE UL channel may at least partially overlap. The at least partial overlap may include at least one blanked or unused radio resource, and the at least partial overlap may occur either in a guard band of the LTE UL channel or in-band of the LTE UL channel.

In certain embodiments, to compensate for the at least one blanked or unused radio resource in the overlap region, an additional uplink narrow band internet of things channel may be used. In other words, an additional uplink carrier resource may be allocated on the other side of the LTE spectrum, meaning that the uplink NB-IoT may be split into two carriers. The UL NB-IoT channel and the additional UL NB-IoT channel may therefore be located on opposite sides of the LTE UL channel. The UE may then transmit data on the UL NB-IoT and the additional UL NB-IoT channel to a network entity. The network entity may then receive the data, in step 630.

Figure 7:
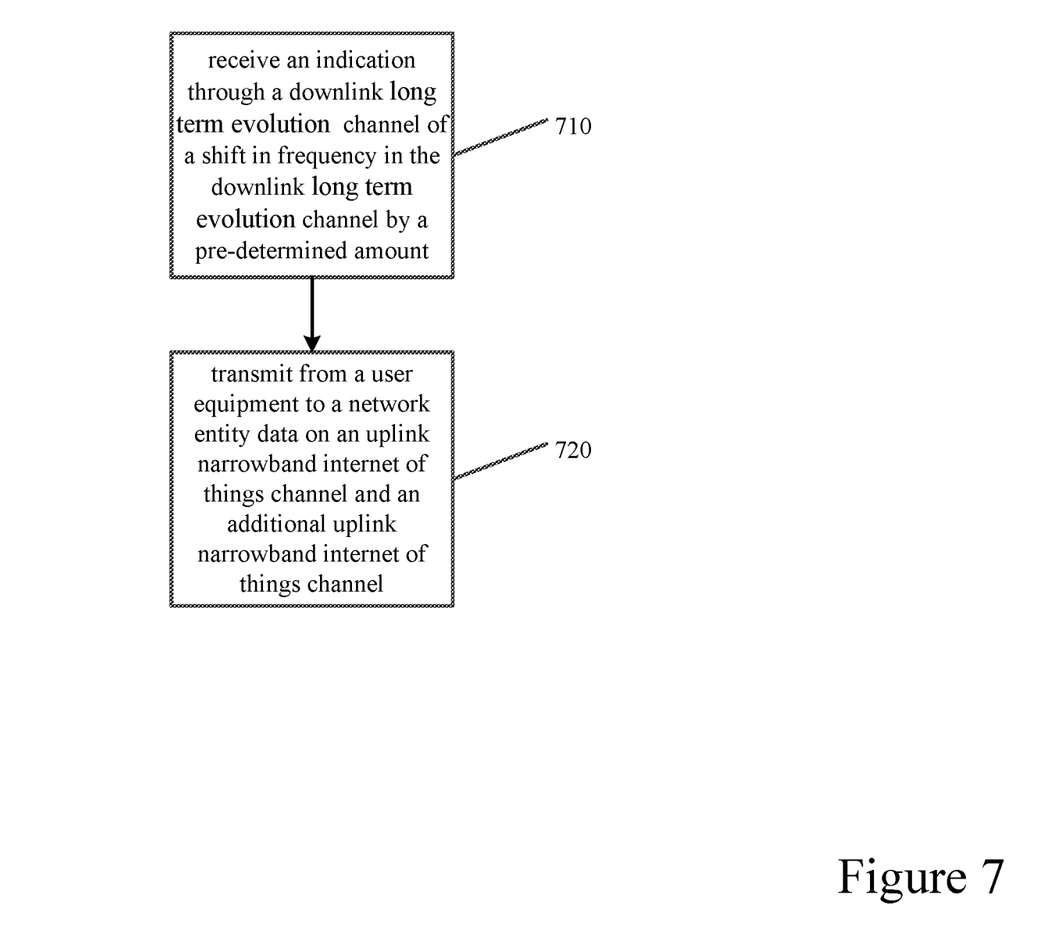
FIG. 7 illustrates a flow diagram according to certain embodiments.

FIG. 7 illustrates a flow diagram according to certain embodiments. Specifically, FIG. 7 illustrates a diagram for a process carried out by a UE. In step 710, the UE may receive an indication through a DL LTE channel of a shift in frequency in the DL LTE channel by a pre-determined amount. The shift may cause a duplex distance between the downlink LTE channel and the uplink LTE channel to change. In step 720, the UE can transmit to a network entity data on a UL NB-IoT and an additional UL NB-IoT channel. At least one overlapping radio resource or subcarrier in at least one of the UL LTE channel or the UL NB-IoT channel may have been blanked. In addition, UL NB-IoT channel and the UL LTE channel may at least partially overlap. As shown in FIGS. 4 and 5, the additional UL NB-IoT channel may be used to compensate for any subcarriers that are blanked or unused in the overlap region. The UL may therefore be split into two UL NB-IoT carriers located on opposite sides of the LTE carrier.

Figure 8:
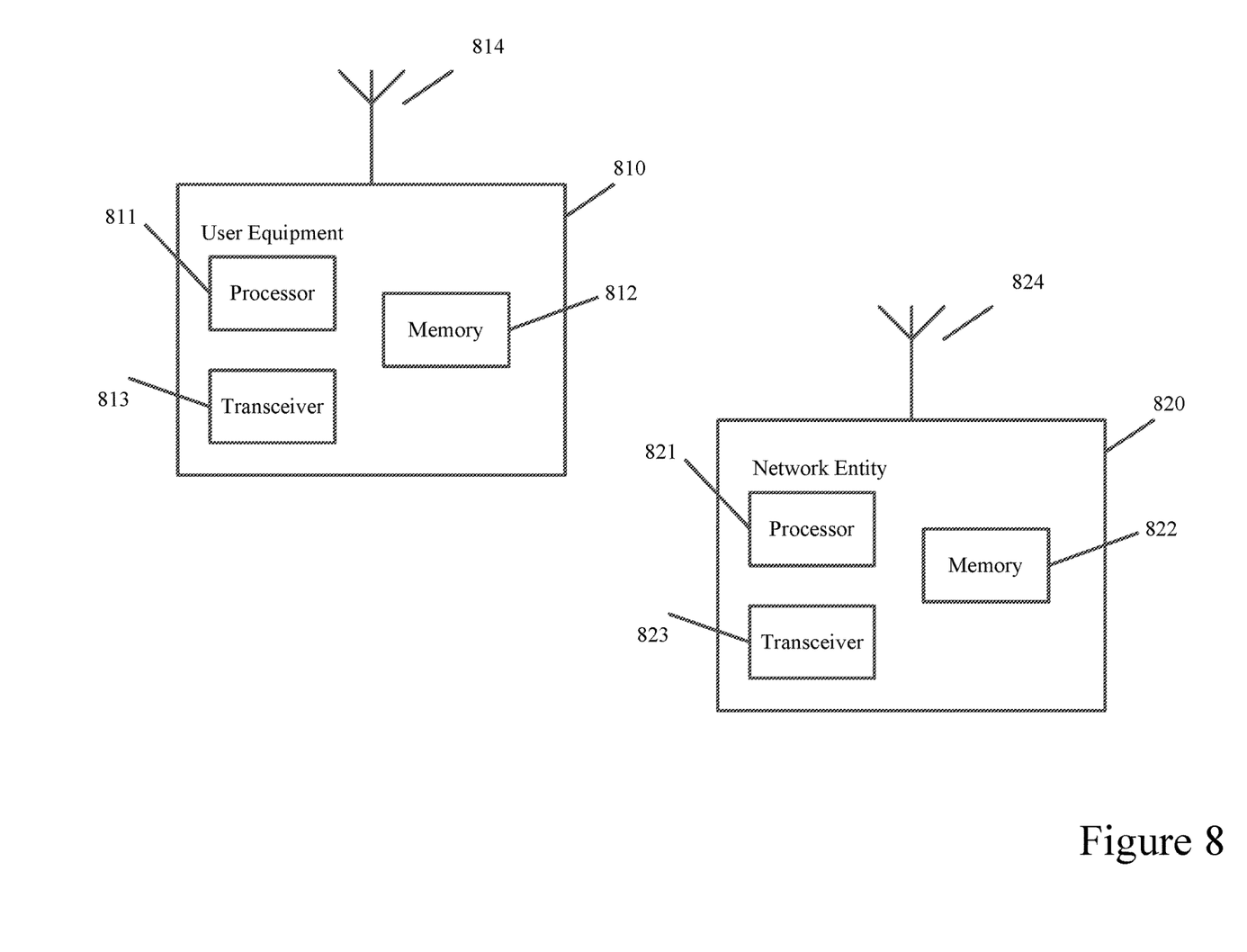
FIG. 8 illustrates a system according to certain embodiments.

FIG. 8 illustrates a system according to certain embodiments. It should be understood that each signal or block in FIGS. 1-7 may be implemented by various means or their combinations, such as hardware, software, firmware, one or more processors and/or circuitry. In one embodiment, a system may include several devices, such as, for example, network entity 820 or UE 810. The system may include more than one UE 810 and more one network node 820, although only one access node shown for the purposes of illustration. The network entity may also be a network node, access node, a base station, a 5GNB, an eNB, server, host, or any of the other access or network node discussed herein.

Each of these devices may include at least one processor or control unit or module, respectively indicated as 811 and 821. At least one memory may be provided in each device, and indicated as 812 and 822, respectively. The memory may include computer program instructions or computer code contained therein. One or more transceiver 813 and 823 may be provided, and each device may also include an antenna, respectively illustrated as 814 and 824. Although only one antenna each is shown, many antennas and multiple antenna elements may be provided to each of the devices. Other configurations of these devices, for example, may be provided. For example, network entity 820 and UE 810 may be additionally configured for wired communication, in addition to wireless communication, and in such a case antennas 814 and 824 may illustrate any form of communication hardware, without being limited to merely an antenna.

Transceivers 813 and 823 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 810 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 1-7. In certain embodiments, at least one memory including computer program code can be configured to, with the at least one processor, cause the apparatus at least to perform any of the processes described herein.

According to certain embodiments, an apparatus 820 may include at least one memory 822 including computer program code, and at least one processor 821. The at least one memory 822 and the computer program code may be configured, with the at least one processor 821, to cause the apparatus 820 at least to shift a frequency of a downlink channel by a pre-determined amount. The shift may cause a duplex distance between the downlink channel and an uplink channel to change. The at least one memory 822 and the computer program code may also be configured, with the at least one processor 821, to also cause the apparatus 820 at least to blank at least one overlapping radio resource in at least one of the uplink channel or a narrowband internet of things channel. The narrowband internet of things channel and the uplink channel at least partially overlap. In addition, the at least one memory 822 and the computer program code may be configured, with the at least one processor 821, to cause the apparatus 820 at least to receive data on the narrowband internet of things channel and an additional uplink narrowband internet of things channel at a network entity from a user equipment.

According to certain embodiments, an apparatus 810 may include at least one memory 812 including computer program code, and at least one processor 811. The at least one memory 812 and the computer program code may be configured, with the at least one processor 811, to cause the apparatus 810 at least to receive an indication through a downlink channel of a shift in frequency in the downlink channel by a pre-determined amount. The shift may cause a duplex distance between the downlink channel and an uplink channel to change. The at least one memory 812 and the computer program code may also be configured, with the at least one processor 811, to also cause the apparatus 810 at least to transmit from a user equipment to a network entity data on a narrowband internet of things channel and an additional uplink narrowband internet of things channel. At least one overlapping radio resource in at least one of the uplink channel or the narrowband internet of things channel may have been blanked. In addition, the narrowband Internet of things channel and the uplink channel may at least partially overlap.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 820 or UE 810, to perform any of the processes described above (see, for example, FIGS. 1-7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 8 illustrates a system including a network entity 820 and UE 810, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 810 may likewise be provided with a variety of configurations for communication other than communication network entity 820. For example, the UE 810 may be configured for device-to-device communication.

Certain embodiments described above may allow for the shifting of an LTE DL channel by a predetermined frequency amount. The network entity may signal a different duplex distance to the UE, which can be caused by the shifting of the frequency of the LTE DL channel. In addition, certain embodiments described above may allow for the blanking of resources or subcarriers in the LTE UL channel and/or the NB-IoT channel. The blanking and/or the shifting can be used to create a sufficient gap at the edge of the channel bandwidth for filter roll-off. This can allow the NB-IoT to successfully operate in the guard band of the LTE UL channel.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to an LTE environment, other embodiments can be directed to other 3GPP technology, such as LTE advanced, 4G, or 5G technology.

PARTIAL GLOSSARY 5G 5th Generation
3GPP 3rd Generation Partnership Project
BTS Base Transceiver Station
DL Downlink
LTE Long Term Evolution
LTExx Different bandwidth options for LTE, where xx denotes the bandwidth in MHz
NB-IoT Narrowband Internet of Things
OFDM Orthogonal Frequency Division Multiplex
PRB Physical Resource Block
PUCCH Physical Uplink Control Channel
SINR Signal to Interferer and Noise Ratio
UE User Equipment
UL Uplink

We claim:

1. An apparatus comprising:
at least one memory comprising computer program code;
at least one processor;
wherein the at least one memory and the computer program code are configured, with the at least one processor, to cause the apparatus at least to:
 shift a frequency of a downlink 3GPP technology channel by a pre-determined amount, wherein the shift causes a duplex distance between the downlink 3GPP technology channel and an uplink 3GPP technology channel to change;
 blank at least one overlapping radio resource in at least one of the uplink 3GPP technology channel or a uplink narrowband internet of things channel, wherein the uplink narrowband internet of things channel and the uplink 3GPP technology channel at least partially overlap; and
 receive data on the uplink narrowband internet of things channel and an additional uplink narrowband internet of things channel at a network entity from a user equipment.

2. The apparatus according to claim 1, wherein the 3GPP technology channels are 5G technology channels.

3. The apparatus according to claim 1, wherein at least one radio resource in the additional uplink narrowband internet of things channel compensates for the blanking of the at least one radio resource in the uplink narrowband internet of things channel.

4. The apparatus according to claim 1, wherein the additional uplink narrowband internet of things channel and the uplink narrowband internet of things channel are located on opposite sides of the 3GPP technology channel.

5. The apparatus according to claim 1, wherein the at least partial overlap of the uplink narrowband internet of things channel and the uplink 3GPP technology channel comprises using a resource blanked out from the uplink 3GPP technology channel for the uplink narrowband internet of things channel, or using a resource blanked out from the uplink narrowband internet of things channel for the uplink 3GPP technology channel.

6. The apparatus according to claim 1, wherein the at least partial overlap of the uplink narrowband internet of things channel and the uplink 3GPP technology channel occurs on a guard band of the uplink 3GPP technology channel.

7. The apparatus according to claim 1, wherein the at least partial overlap of the uplink narrowband Internet of things channel and the uplink 3GPP technology channel occurs in-band of the uplink 3GPP technology channel.

8. The apparatus according to claim 1, wherein the at least one memory and the computer program code are configured, with the at least one processor, to cause the apparatus at least to:
 place the uplink narrowband internet of things channel directly adjacent to the 3GPP technology uplink channel.

9. The apparatus according to claim 1, wherein the at least one memory and the computer program code are configured, with the at least one processor, to cause the apparatus at least to:
 blank the at least one overlapping radio resource in a physical uplink control channel.

10. The apparatus according to claim 1, wherein the downlink 3GPP technology channel and the uplink 3GPP technology channel are channels are associated with a hosting 3GPP technology network.

11. The apparatus according to claim 1, wherein the blanking of the at least one overlapping radio resource in the uplink 3GPP technology channel or the uplink narrowband internet of things channel is restricted to a predetermined number of resources.

12. The apparatus according to claim 1, wherein the frequency of the downlink 3GPP technology channel is shifted by an integer multiple of 100 kilohertz.

13. The apparatus according to claim 1, wherein no leakage above a pre-determined regulatory limit outside the uplink 3GPP technology channel occurs.

14. An apparatus comprising:
at least one memory comprising computer program code;
at least one processor;
wherein the at least one memory and the computer program code are configured, with the at least one processor, to cause the apparatus at least to:
 receive an indication through a downlink 3GPP technology channel of a shift in frequency in the downlink 3GPP technology channel by a pre-determined amount, wherein the shift causes a duplex distance between the downlink 3GPP technology channel and an uplink 3GPP technology channel to change; and
 transmit from a user equipment to a network entity data on an uplink narrowband Internet of things channel and an additional uplink narrowband internet of things channel,
wherein at least one overlapping radio resource in at least one of the uplink 3GPP technology channel or the uplink narrowband internet of things channel has been blanked, and wherein the uplink narrowband internet of things channel and the uplink 3GPP technology channel at least partially overlap.

15. The apparatus according to claim 14, wherein the 3GPP technology channels are 5G technology channels.

16. The apparatus according to claim 14, wherein at least one radio resource in the additional uplink narrowband internet of things channel compensates for the blanking of the at least one radio resource in the uplink narrowband internet of things channel.

17. The apparatus according to claim 14, wherein the additional uplink narrowband internet of things channel and the uplink narrowband internet of things channel are located on opposite sides of the 3GPP technology channel.

18. The apparatus according to claim 14, wherein the at least partial overlap of the uplink narrowband internet of things channel and the uplink 3GPP technology channel occurs on a guard band of the uplink 3GPP technology channel.

19. The apparatus according to claim 14, wherein the at least partial overlap of the uplink narrowband internet of things channel and the uplink 3GPP technology channel occurs in-band of the uplink 3GPP technology channel.

20. A method for performing a process according to claim 1.

21. A non-transitory computer-readable medium encoding instructions that, when executed in hardware, perform a process according to claim 1.

22. A computer program product encoding instructions for performing a process according to claim 1.

23. A method for performing a process according to claim 14.

24. A non-transitory computer-readable medium encoding instructions that, when executed in hardware, perform a process according to claim 14.

25. A computer program product encoding instructions for performing a process according to claim 14.

* * * * *